June 8, 1965 K. KORDESCH ETAL 3,188,242
FUEL CELL BATTERY CONTAINING FLAT CARBON ELECTRODES
Original Filed Jan. 22, 1959 4 Sheets-Sheet 1

INVENTORS
KARL KORDESCH
SAMUEL H. RAUB
LAWRENCE J. ULINE
BY John R. Hoberly
ATTORNEY June 8, 1965  K. KORDESCH ETAL  3,188,242
FUEL CELL BATTERY CONTAINING FLAT CARBON ELECTRODES
Original Filed Jan. 22, 1959  4 Sheets-Sheet 2

INVENTORS
KARL KORDESCH
SAMUEL H. RAUB
LAWRENCE J. ULINE

BY John R. Wohlert
ATTORNEY

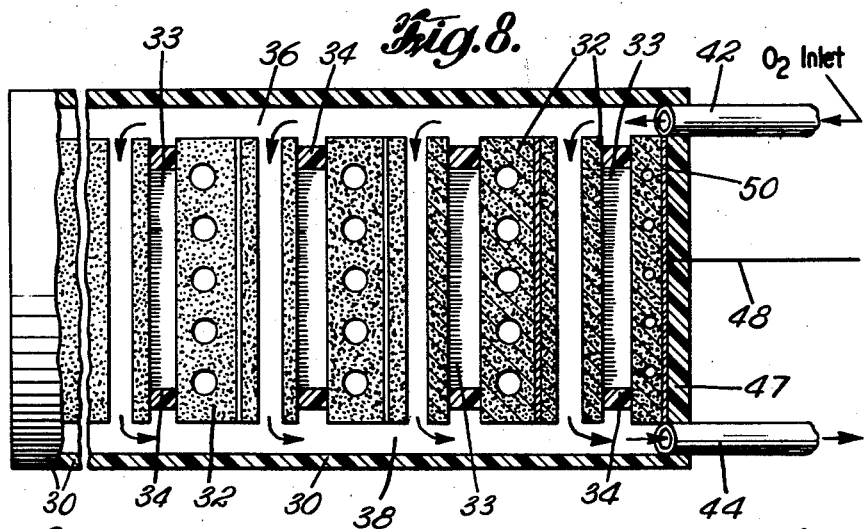
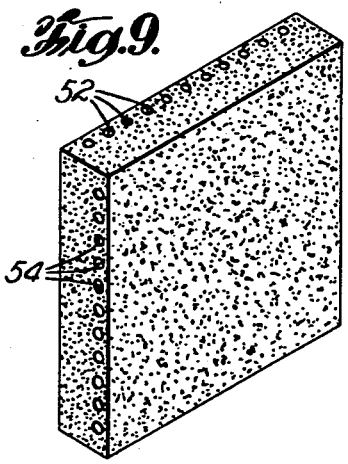
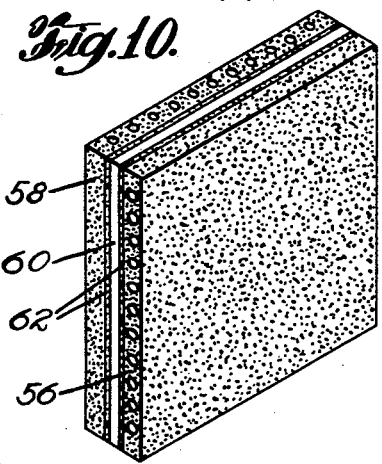
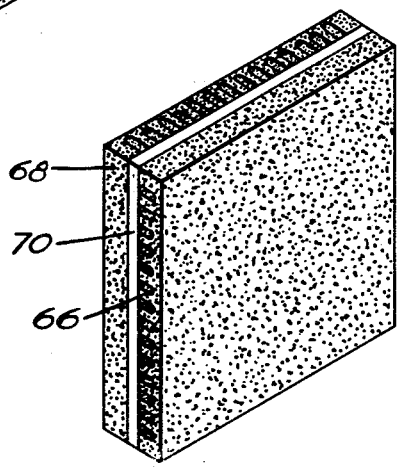
INVENTORS
KARL KORDESCH
SAMUEL H. RAUB
LAWRENCE J. ULINE
BY *John R. Hokerty*
ATTORNEY

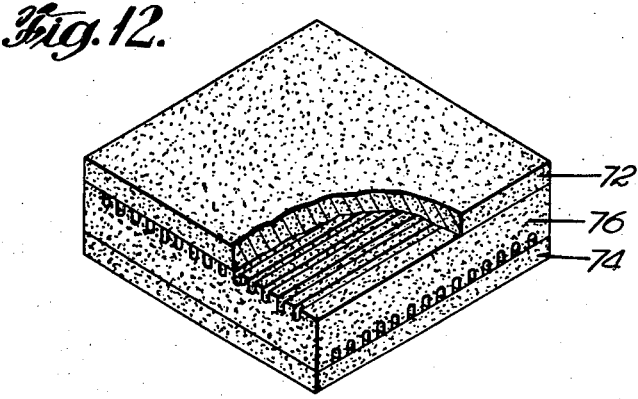
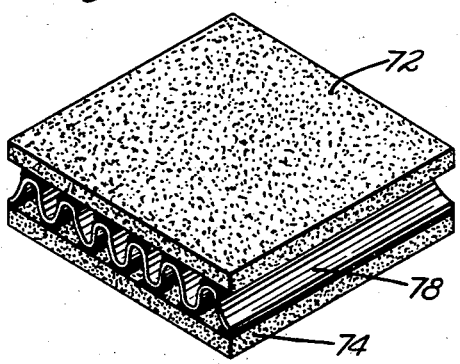
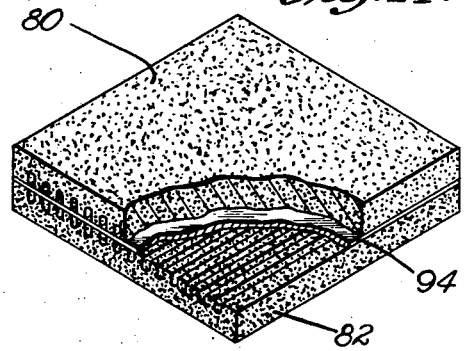
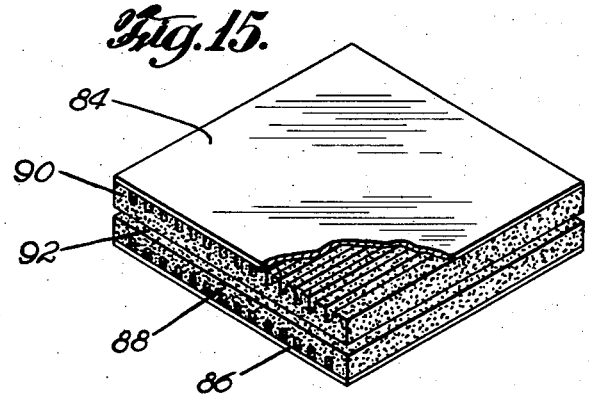
INVENTORS
KARL KORDESCH
SAMUEL H. RAUB
LAWRENCE J. ULINE

United States Patent Office 3,188,242
Patented June 8, 1965

3,188,242
FUEL CELL BATTERY CONTAINING FLAT
CARBON ELECTRODES
Karl Kordesch, Lakewood, Samuel H. S. Raub, Bay Village, and Lawrence J. Uline, Lakewood, Ohio, assignors to Union Carbide Corporation, a corporation of New York
Original application Jan. 22, 1959, Ser. No. 788,390. Divided and this application July 13, 1962, Ser. No. 209,580
3 Claims. (Cl. 136—86)

This is a division of application Serial No. 788,390, filed January 22, 1959, now abandoned.

This invention relates to flat electrodes for fuel cells designed to operate at low voltage and high current.

The fuel cells for which the present electrodes are intended can be of several types. They may, for example, operate by the diffusion of hydrogen gas through a negative electrode to liberate electrons by ionization through an electro-chemical reaction with alkaline electrolyte. Similarly the electrodes of the present invention can be used in a fuel cell which produces electricity by combining hydrogen and chlorine gases. In this type of cell hydrogen and chlorine gases are supplied to electrodes immersed in acid electrolyte. Hydrogen diffuses through its electrode to give two electrons and two hydrogen ions per mole of hydrogen. Chlorine gas dissociates into two chlorine ions with the net result that there occurs a net flow of two electrons from the hydrogen to the chlorine electrodes. Fuel cells using other fuel gases may also advantageously employ the principles of the instant invention.

The main object of the invention is to provide a rugged, flat, stacked fuel cell battery designed to operate efficiently at low voltage and high current.

Another object of the invention is to provide rugged, flat negative and positive electrode elements characterized by a low internal resistance.

Another object of the invention is to provide rugged bipolar fuel cell electrodes having a large effective surface area.

A further object is to provide rugged unit cell electrodes having a large effective surface area.

In the drawings:

FIG. 8 is a lengthwise cross-sectional view of the assembly of FIG. 6;

FIGS. 9, 10 and 11 are perspective views of electrode assemblies in accord with the invention; and FIGS. 12, 13, 14 and 15 are perspective views partially broken away of additional embodiments of the invention.

The electrodes from which the fuel cell battery of the invention are made comprise a flat plate of porous carbon. These carbon plates can be fabricated, for example, from a mix comprising about 100 parts of finely divided carbon black, about 63 parts of soft pitch and about 3 parts fuel oil. Once formed, by extruding or otherwise, the plates are baked at 1000° C. for about six hours. Carbon plates thus made have a porosity of the order of 18 to 20 percent as measured by water saturation methods. Porosity of the plates preferably is increased to about 25 percent by heating the plates at 850° to 950° C. in a carbon dioxide atmosphere for several hours.

To activate the carbon plates prepared as above outlined, a catalyst solution such as an 0.1 M solution of cobaltous nitrate $Co(NO_3)_2 \cdot 6H_2O$ and aluminum nitrate $Al(NO_3)_3 \cdot 9H_2O$, is applied to the plates and heat decomposed therein to form cobaltic oxide-aluminum complex ($CoO \cdot Al_2O_3$) on the carbon surfaces. This treatment is necessary only for the oxygen electrodes. To simplify manufacturing operations, however, it is more practical to treat both the oxygen and hydrogen electrodes in this manner. The final porosity of the electrodes thus treated ranges from 30 to 35 percent. Following the previously outlined treatments, the hydrogen electrodes are coated with a suitable hydrogen ionization catalyst such as platinum or rhodium. Suitably, this can be done by means of a 10 percent aqueous solution of chloroplatinic acid or of rhodium trichloride, which is painted on the electrode surface, and is thermally decomposed in a hydrogen atmosphere at a temperature approaching 400° C. to leave only the metal on the hydrogen electrode surface. The range of ¼ to 8 milligrams of metal per centimeter square gives satisfactory results. Good performance is achieved at the two milligram per square centimeter concentration of metal on the electrode surface. In addition to platinum and rhodium, it should be noted that other transition metals from Group VIII, including palladium, iridium, ruthenium and osmium or mixtures thereof can be employed to promote rapid hydrogen ionization in cells designed to operate at room temperature. Iron and nickel can also be used as catalysts to promote hydrogen ionization, but these perform best when the fuel cell battery operates only at high temperatures.

It should be noted that more efficient electrode operation and longer electrode life, especially in the case of the hydrogen electrode, can be achieved by coating the electrode surface with a porous sodium carboxymethyl cellulose film.

Figure 1:
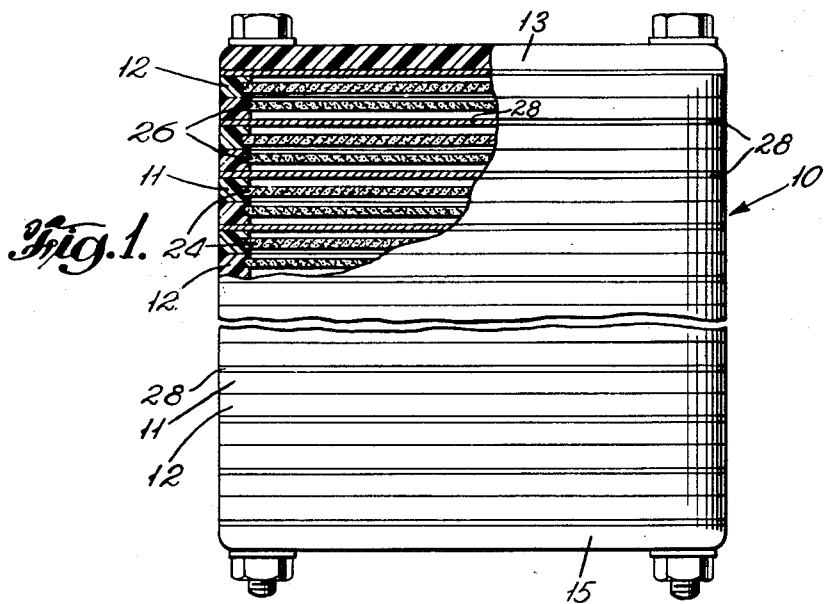
FIG. 1 is a front elevational view partially in section of a fuel cell battery containing the electrodes of the invention.
Figure 2:
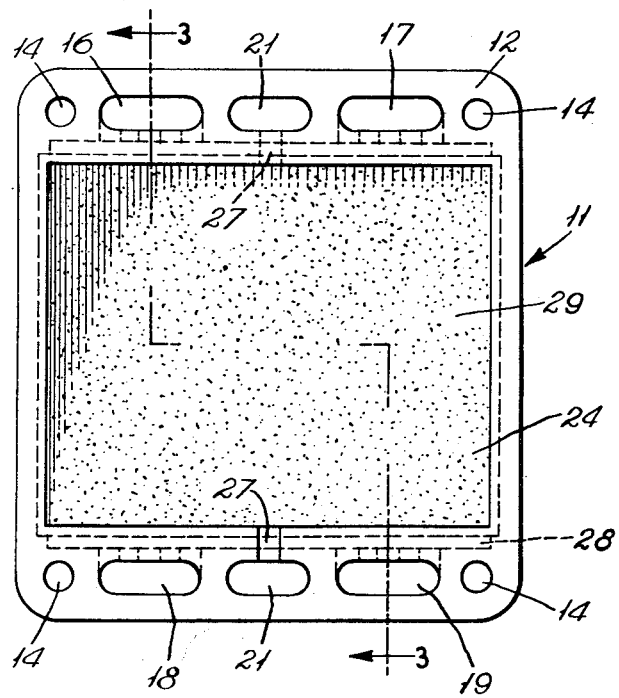
FIG. 2 is a plan view of a bipolar half cellular arrangement for the fuel cell battery shown on FIG. 1.
Figure 3:
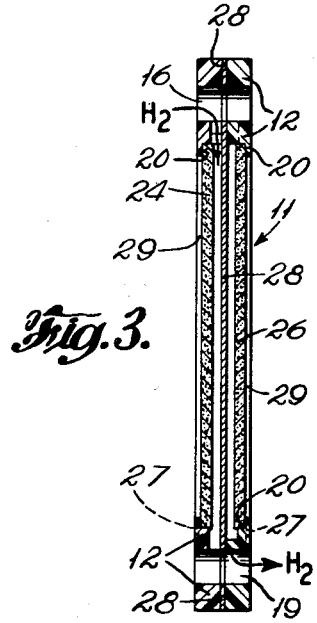
FIG. 3 is a cross-sectional view of a bipolar electrode unit as shown in FIG. 2, and taken along lines 3—3 thereof.
Figure 4:
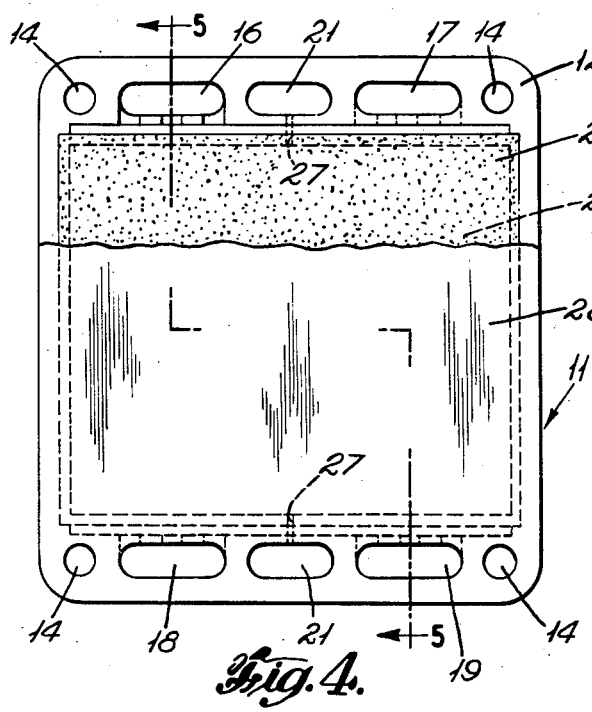
FIG. 4 is a plan view of a complete unit cell of FIG. 1.
Figure 5:
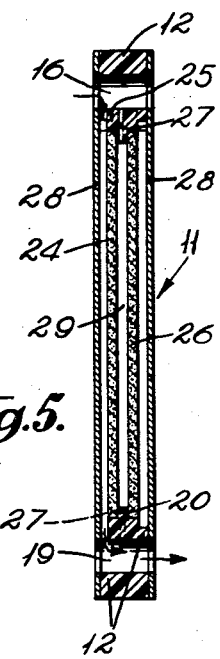
FIG. 5 is a cross-sectional view of the unit cell of FIG. 4 taken along lines 5—5 thereof.

Referring now to the drawing, there is shown in FIG. 1 a front elevational view of a fuel cell battery generally designated by reference character 10, and comprising a plurality of stacked cell units, each designated generally by reference character 11, and having terminal plates 13 and 15. FIGS. 2 and 4 show plan views, respectively, of alternative bipolar half cell and complete cell modifications of the units shown in FIG. 1. Referring to the bipolar half cell unit modification of FIGS. 2 and 3, these units have half cell frames 12, which are molded from plastic. Each half cell unit has four tie bolt holes 14 at each corner thereof. To avoid shorting, these holes should be insulated from the cell. The half cell units are each provided also with hydrogen inlet 16, oxygen inlet 17, oxygen outlet 18 and hydrogen outlet 19, as well as with two other openings 21, which form an electrolyte well when several half-cell units are superimposed. As shown in cross-section 3—3 of FIG. 3, the half cell frames have two shoulders 20 on which rest carbon anode 24 and carbon cathode 26, respectively. Passing through the plastic frame 12 is an electrolyte inlet 27 communicating with electrolyte space 29, which lies intermediate the anode of one unit and the cathode of the adjacent half-cell unit. Each half cell electrode is separated from the other by means of an impervious metal gas barrier and cell contact plate 28. Further details of this arrangement may be seen in isometric cutaway view in FIG. 14, wherein anode 82 and cathode 80 are separated by impervious metal gas barrier and cell contact 94.

As noted above, it should be observed that when the battery is assembled from a plurality of half-cell units, the superimposition of the various gas inlets and of the openings designated at 21, provides considerable free space within the battery for electrolyte and gas, and permits hydrogen gas to have access through hydrogen inlet 16 to anode 24 and hydrogen outlet 19, similarly permitting oxygen gas to have access through inlet 17 to cathode 26 and oxygen outlet 18.

Figures 6, 7:
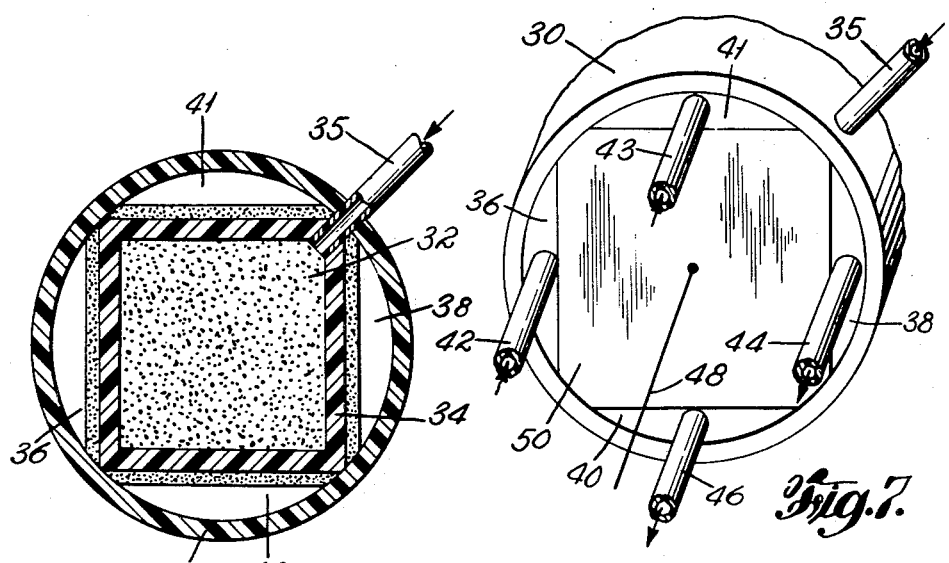
FIG. 6 is a cross-sectional view of a battery assembly containing the electrodes of the invention.
FIG. 7 is a perspective view showing the enclosure of the assembly of FIG. 6.

While in the above description the cell units have been shown to be rectangular, the present invention is naturally not limited to such configuration. Thus there appears in FIGS. 6, 7 and 8 a tubular plastic enclosure 30 into which are inserted carbon electrodes 32 separated by a hollow square plastic separator 34 having slightly smaller dimensions than the electrodes. The volume bounded by the spacer, and labeled 33 in FIG. 8, serves as an electrolyte compartment which can be filled by means of tube 35 (shown on FIGS. 6 and 7), which passes through a corner of spacer 34. Water can be added through this tube to maintain constant the concentration of the electrolyte, since the moisture produced by electrode reactions and from the evaporation of the electrolyte tends to be removed by the hydrogen and oxygen streams. The diametrically opposite spaces labeled 36 and 38 in FIG. 6 are oxygen compartments, while similar spaces 40 and 41 are hydrogen compartments. Entrance to the oxygen compartment 36 is provided through inlet tube 42, and oxygen leaves compartment 38 through outlet tube 44; similarly hydrogen inlet tube 43 communicates with hydrogen compartment 40, and hydrogen outlet tube 46 communicates with hydrogen compartment 40. As shown, the end of tubular enclosure 30 is sealed by means of a circular plastic cap 47. A copper wire 48 extends through cap 47, and contacts collector 50 positioned between the top oxygen electrode and the plastic cap 47, and may be suitably connected to battery terminals shown as 13 and 15 in FIG. 1. Suitably, collector 50 may consist of a thin sheet of silver foil or of a thin layer of sprayed silver.

FIG. 8 shows a lengthwise cross-section of the cell described above. The arrows indicate the direction of oxygen gas flow through oxygen compartments 36 and 38 from oxygen inlet tube 42 through oxygen outlet tube 44.

A number of flat electrode structures may be used in accord with the present invention. Thus on FIG. 9 there is shown a bipolar electrode having a first set of holes 52 drilled on the side of the electrode serving as the hydrogen electrode, and another set of openings 54 on the other side of the electrode at right angles thereto, and serving as the oxygen electrode.

A further embodiment of the electrodes of this invention appears on FIG. 10. In this embodiment two separate carbon plates 56 and 58 having lengthwise holes drilled or formed by molding into them are used. The plates may be cemented together with a thin layer of gas-impervious, conductive cement. In the embodiment shown on FIG. 10, a thin sheet of conductive material 60, such as silver or titanium or impervious carbon is cemented at 62 between the plates. The arrangement shown prevents any diffusion of the gases between the two electrodes.

A further modification of the invention is shown on FIG. 11. It consists of two flat plates 66 and 68, having grooves along one face of each plate. The plates, separated by a thin impervious carbon plate or metal sheet 70 are so placed that the grooved sides face each other. The grooves indicated may be formed by machining, extrusion or molding.

Still another embodiment of the invention is shown on FIG. 12. This structure may be termed "sandwich" in that it consists of two smooth-surfaced porous carbon plates 72 and 74, which are cemented by means of a conductive cement to a centrally located impervious carbon or graphite plate 76. Plate 76 is corrugated on both faces. The grooves on one face may run parallel or at an angle to those on the opposite face, as shown in the figure. An advantage lies in using the vertical parallel arrangement of the grooves in that both hydrogen and oxygen gases will thus flow vertically through the assembled battery, thereby eliminating moisture problems encountered when one of the gases contacts the carbon surface by horizontal flow.

A structure alternate to that shown on FIG. 12 is shown on FIG. 13. Here a corrugated barrier 78, composed of titanium, steel or impervious carbon, is substituted for the grooved impervious carbon plate shown on FIG. 12.

Two additional variants of the invention appear in FIGS. 14 and 15. FIG. 14 shows a bipolar electrode structure wherein two carbon plates 80, 82, having one corrugated side, are positioned facing each other, but with an impervious metal barrier 94 placed between them. FIG. 15 shows a complete unit cell in which carbon anode 88 and cathode 90 are backed by gas-impervious metal barriers and contact plates 86 and 84, respectively. The central space 92 between the carbon electrodes serves as an electrolyte compartment when the unit cell is secured within appropriate framework. In one case (FIG. 14) the arrangement constitutes a bipolar electrode which when placed in series with others like it, has an electrolyte space provided between the bipolar electrodes. In the other instance (FIG. 15), the structure is a unit cell having the electrolyte space already present.

The efficiency of a fuel cell of the type herein described has been calculated to be far greater than that of conventional tubular electrode arrangement, as the following examples will illustrate: A cell (12 inches long by 4 inches diameter) containing nine tubular carbon electrodes (¾ inch O.D.) and having conventional metal current collectors produced 0.84 volt at 10 amperes. The internal ohmic resistance of this system is at least in the order of 0.004 ohm, so that actual terminal voltage is 0.84 to 0.04=0.80 volt or an output of 8 watts per cell. The problem, although not serious up to this point, becomes serious if the cell operates at a current of 50 amperes where the voltage drops to 0.84 to 0.20=0.64 volt. This represents a power loss of approximately 25 percent.

In a cell of the same volume as above, but containing the disclosed flat plate structures, the internal resistance of the bipolar electrode is calculated to be less than 0.001 ohm per cell, which when operated at 10 amperes, produces a negligible voltage drop of 0.01 volt. Increasing the current to 50 amperes results in a loss of only 0.05 volt per cell or the production of 0.79 volt (39.5 watts/cell) at the terminals. The power loss in this instance is only 6 percent instead of 25 percent in the case of the tubular construction.

The present cell operates with conventional liquid electrolytes, the nature of which depends on the gases supplied thereto. Thus, in a fuel cell producing electricity from hydrogen and oxygen, the electrolyte preferably should be 7 to 15 Normal potassium hydroxide, to which may be added from 0.01 to 2 percent by weight of potassium osmate. Where the fuel cell is to function with hydrogen and chlorine gases, a preferred electrolyte is 4 Normal hydrochloric acid.

The structure herein disclosed is designed to operate at a range of gas pressures ranging from about 1/10 to about 10 atmospheres, at temperatures ranging from about 20° C. to about 150° C.

The fuel cell of this invention is suitable for use in communications system, mobile power units and stand-by power plants.

We claim:
1. A fuel cell battery comprising: (A) a generally tubular enclosure of a non-conductive material; (B) a plurality of pairs of substantially rectangular carbon electrodes, each electrode pair comprising (1) a fuel electrode having a fuel gas surface, an electrolyte surface and four outer edge surfaces, (2) an oxidant electrode having an oxidant gas surface, an electrolyte surface and four outer edge surfaces, the gas surface of said fuel electrode facing the gas surface of said oxidant electrode, and (3) a barrier of conductive gas-impervious material between the gas surfaces of said pair of electrodes, the gas surface of said fuel electrode and one surface of said gas-impervious barrier defining a plurality of substantially straight fuel gas channels, the opposite side of said gas-impervious barrier and the gas surface of said oxidant electrode defining a plurality of substantially straight oxidant gas channels, said conductive gas-impervious barrier being in conductive contact with both of said electrodes; (C) a plurality of non-conductive annular spacer elements of substantially rectangular perimeter separating said plurality of electrode pairs, said non-conductive spacer elements being disposed around the periphery of the electrolyte surfaces of said electrodes, one of said spacer elements together with the electrolyte surface of the oxidant electrode of one of said electrode pairs and the electrolyte surface of the fuel electrode of the adjacent electrode pair defining an electrolyte chamber between said adjacent electrode pairs; (E) all four corners of each of said electrodes and each of said spacer elements being in gas tight contact with the inner walls of said tubular enclosure; (F) a first inlet manifold and first outlet manifold communicating with the fuel gas channels of each fuel electrode to provide circulation of fuel gas across said fuel gas electrode surfaces; (G) a second inlet manifold and second outlet manifold communicating with the oxidant gas channels of each oxidant electrode to provide circulation of oxidant gas across said oxidant gas electrode surfaces, said four manifolds being defined by the inner walls of said tubular enclosure and the outer edge surfaces of said electrodes and said spacer elements; and (H) openings through said tubular enclosure and through a corner of each of said spacer elements communicating with each of said electrolyte chambers to supply electrolyte thereto.

2. A fuel cell battery as defined in claim 1 wherein each of said electrode pairs comprises two porous carbon plates, each plate having grooves across one side thereof, the grooved side of each plate being fastened by means of conductive cement to a conductive, gas-impervious smooth-surfaced carbon plate disposed between said grooved plates.

3. A fuel cell battery as defined in claim 1 wherein each of said electrode pairs comprises two smooth-surfaced porous carbon plates in conductive contact with and separated by a corrugated, conductive, gas-impervious barrier element.

References Cited by the Examiner
UNITED STATES PATENTS

| | | |
|---|---|---|
| 2,175,523 | 10/39 | Greger. |
| 2,276,188 | 3/42 | Greger. |
| 2,901,523 | 8/59 | Justi et al. _____ 136—86 |
| 2,969,315 | 1/61 | Bacon _____ 136—86 |
| 3,012,086 | 12/61 | Vahldrick _____ 136—86 |

JOHN H. MACK, *Primary Examiner.*

JOHN R. SPECK, *Examiner.*